United States Patent [19]
Lu et al.

[11] Patent Number: 5,985,237
[45] Date of Patent: Nov. 16, 1999

[54] PROCESS FOR PRODUCING LITHIUM MANGANESE OXIDE SUITABLE FOR USE AS CATHODE MATERIAL OF LITHIUM ION SECONDARY BATTERIES

[75] Inventors: Qi Lu, Osaka; Gohei Yoshida, Nara; Kazuhiko Hirao, Osaka; Yukinori Honjo, Tokyo, all of Japan

[73] Assignee: Honjo Chemical Corporation, Osaka, Japan

[21] Appl. No.: 08/959,605

[22] Filed: Oct. 28, 1997

[30] Foreign Application Priority Data

Oct. 29, 1996 [JP] Japan ................................. 8-286412

[51] Int. Cl.⁶ .......................... C01G 45/12; H01B 1/06; H01M 4/50; H01M 4/32
[52] U.S. Cl. .................. 423/599; 423/594; 252/519.1; 429/224; 429/223
[58] Field of Search .................... 423/599, 594; 429/224, 223, 218, 221, 229; 252/518.1, 519.1

[56] References Cited

U.S. PATENT DOCUMENTS

| | | | |
|---|---|---|---|
| 5,496,664 | 3/1996 | Sterr | 429/224 |
| 5,565,688 | 10/1996 | Hayashi et al. | 252/182.1 |

FOREIGN PATENT DOCUMENTS

| | | |
|---|---|---|
| 0 279 265 A1 | 8/1988 | European Pat. Off. . |
| 0 712 173 A1 | 5/1996 | European Pat. Off. . |
| 60-225358 | 9/1985 | Japan . |
| 4-198028 | 7/1992 | Japan . |
| 04253161 | 8/1992 | Japan . |
| 6-203834 | 7/1994 | Japan . |
| 7-78611 | 3/1995 | Japan . |
| 8-37006 | 2/1996 | Japan . |
| 8-37027 | 2/1996 | Japan . |

OTHER PUBLICATIONS

Haitao Huang and Peter G. Bruce; "3 V and 4 V lithium manganese oxide cathodes for rechargeable lithium batteries"; *Journal of Power Sources*; 1995; pp. 52–57.

A. Robert Armstrong and Peter G. Bruce; "Synthesis of layered LiMnO₂ as an electrode for rechargeable lithium batteries"; *Letters to Nature*; Jun. 6, 1996; vol. 381, pp. 499–500.

Tsutomu Ohzuku, Junji Kato, Keijiro Sawai and Taketsugu Hirai; "Electrochemistry of Manganese Dioxide in Lithium Nonaqueous Cells"; *J. Electrochem. Soc.*,; Sep. 1991; vol. 138, No. 9, pp. 2556–2560.

*Primary Examiner*—Yogendra Gupta
*Assistant Examiner*—Derrick G. Hamlin
*Attorney, Agent, or Firm*—Merchant & Gould P.C.

[57] ABSTRACT

A process for producing a lithium manganese oxide which has a formula of $Li_xMnO_2$ in which x is between 0.1 and 1 and which is suitable for use as a 3 volt cathode material, which comprises mixing at least one lithium compound with at least one manganese compound at a Li/Mn atomic ratio of 0.1–1 in a solvent selected from an aliphatic lower alcohol having from 1 to 3 carbon atoms, water and a mixture of the alcohol and water, allowing the resultant mixture to form a gel-like mixture, drying the gel-like mixture as required, and calcining the resulting product in an oxidative atmosphere at a temperature of 200–350° C.

8 Claims, 4 Drawing Sheets

PROCESS FOR PRODUCING LITHIUM MANGANESE OXIDE SUITABLE FOR USE AS CATHODE MATERIAL OF LITHIUM ION SECONDARY BATTERIES

BACKGROUND OF THE INVENTION

1. Field of the Invention

This invention relates to a process for producing a lithium manganese oxide suitable for use as a 3 volt cathode (positive electrode) material of lithium ion secondary (rechargeable) batteries. More particularly, this invention relates to a process for producing a lithium manganese oxide which has a large specific surface area and a large tap density and is suitable for use as a 3 volt high energy density cathode material of non-aqueous electrolyte (organic electrolyte) lithium ion secondary batteries easily by use of less costly starting materials,

2. Prior Art

Backed by the recent demands for small sized and high performance electronic appliances, high voltage and high energy density lithium ion secondary batteries are already in use as their power sources in some fields. Lithium ion secondary batteries are also expected to be promising as power sources for large scale electric power storage systems or electricmobiles to cope with world-wide decrease in resources and environmental pollution.

A lithium cobalt oxide, $LiCoO_2$, has been so far used as a high performance cathode material of non-aqueous electrolyte lithium ion secondary batteries. However, since the amount of cobalt in natural resources is small and it is expensive, a lithium nickel oxide or a lithium manganese oxide has attracted attention as a cathode material of non-aqueous electrolyte lithium ion secondary batteries in the next generation.

Since the amount of manganese is rich in natural resources and it is less expensive, the study for practical use of a 4 volt spinel lithium manganese oxide or a 3 volt layered lithium manganese oxide has been conducted. Among these oxides, the latter lithium manganese oxide has a theoretical charge-discharge capacity of 286 mAh/g and it is expected that the oxide has a charge-discharge capacity larger than the lithium cobalt oxide ($LiCoO_2$).

According to A. R. Armstrong et al., Nature, Vol. 381, Jun. 6, 1996, pp. 499–500, the solid-state reaction between stoichiometric quantities of sodium carbonate and manganese (III) oxide under an argon atmosphere provides a stoichiometric sodium manganese oxide ($NaMnO_2$) and the ion exchange of the oxide provides a stoichiometric lithium manganese oxide ($LiMnO_2$) which has a layered structure.

However, lithium manganese oxides including $LiMnO_2$ for use as a cathode material of lithium ion secondary batteries have been hitherto produced by a dry calcining process or a solid-state synthesizing process wherein a powder of a lithium compound such as lithium hydroxide or lithium carbonate is dry-mixed with a powder of a manganese oxide and then the powder mixture is calcined at a temperature as high as 500° C. or more, as described in Japanese Patent Application Laid-open No. 8-37006 or No. 8-37027.

In general, a solid-state reaction using two solid powders as reactants is carried out by heating the solid powders at high temperatures capable of moving ions or atoms constituting the reactants, and mutually diffusing the ions or the atoms between the solid phases of these two solid powders. Accordingly, the smaller the diameter of the particle of the solid reactants, the shorter the diffusion distance and the larger the diffusion surface. Thus, a dense product having a uniform composition can easily be obtained.

However, in the production of a desired oxide by the dry calcining method, it is difficult to obtain a uniform powder mixture having a particle diameter of a submicron level by dry-mixing a powder of a manganese oxide with a powder of a lithium compound since the manganese oxide and lithium compound have a particle diameter of from several microns to tens of microns, and in particular, lithium hydroxide has a particle diameter of more than about 100 microns or more. Further, since the starting materials and the resulting final products have a low thermal conductivity, it is necessary to calcine the powder mixture at high temperatures for many hours, and in addition, it is necessary to repeat such high temperature calcination in order to obtain a lithium manganese oxide by dry calcination of the powder mixture.

Thus, when the calcination temperature and time are inappropriate in the calcination of the powder mixture, undesired by-products are often formed or the surface properties of the resultant product undesirably change with the result that a high performance cathode material for lithium ion secondary batteries are not obtained.

A further method, e.g., a melt impregnation method, is also known wherein lithium nitrate is heated and melted, and manganese dioxide is impregnated with the melted lithium compound, followed by calcining the product at high temperatures (J. Power Sources, 54 (1995), 483–486). However, the method also needs to repeat high temperature calcination for many hours.

SUMMARY OF THE INVENTION

This invention has been made to solve the problems in the conventional production of a lithium manganese oxide for use as a 3 volt cathode material of lithium ion secondary batteries. It is an object of the invention to provide a process for producing a lithium manganese oxide which has a large surface area and a large tap density and is suitable for use as a 3 volt cathode material having a large charge-discharge capacity by a simple process by use of less costly starting materials.

The invention provides a process for producing a lithium manganese oxide which has a formula of $Li_xMnO_2$ in which x is between 0.1 and 1 and which is suitable for use as a 3 volt cathode material, which comprises mixing at least one lithium compound with at least one manganese compound at a Li/Mn atomic ratio of 0.1–1 in a solvent selected from an aliphatic lower alcohol having from 1 to 3 carbon atoms, water and a mixture of the alcohol and water, allowing the resultant mixture to form a gel-like mixture, drying the gel-like mixture as required, and calcining the resulting product in an oxidative atmosphere at a temperature of 200–350° C.

DESCRIPTION OF PREFERRED EMBODIMENTS

Figure 1:
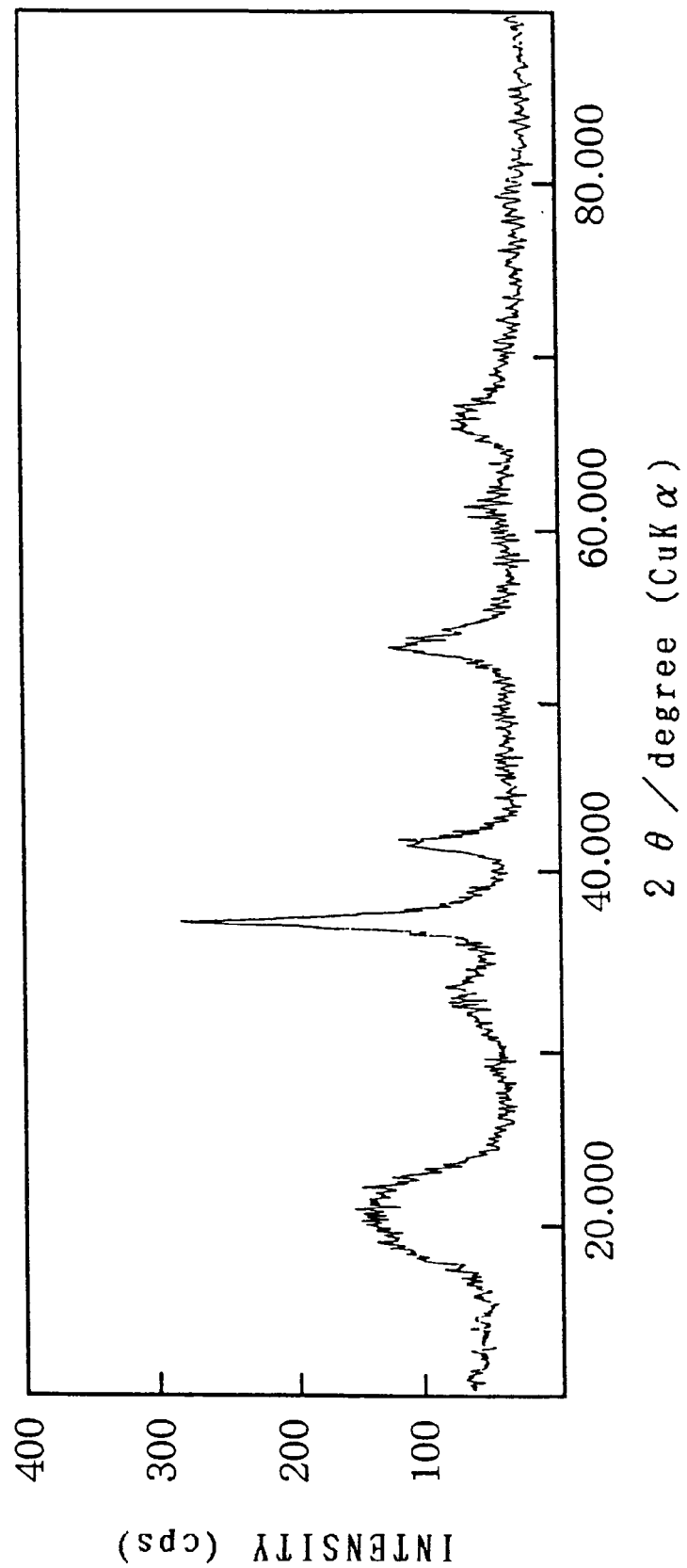
FIG. 1 is an X-ray diffraction pattern of $Li_{0.35}MnO_2$ prepared by the process of the invention.

According to the process of the invention, as the starting materials, at least one lithium compound selected from the group consisting of lithium hydroxide, lithium oxide, lithium carbonate and lithium salts of organic acids of 1–3 carbons is used and at least one manganese compound selected from the group consisting of manganese dioxide, manganese hydroxide and manganese carbonate is used. The lithium salts of organic acids may be lithium formate, lithium acetate or lithium propionate. Among these starting materials, lithium hydroxide and manganese dioxide are particularly preferred.

According to the process of the invention, the starting materials are used in the form of powder. However, the starting materials are not particularly limited with respect to the particle diameter.

In accordance with a preferred embodiment of the process of the invention, manganese dioxide is first added to the solvent to form a suspension. Lithium hydroxide is then added to the suspension and the resultant mixture is stirred and allowed to form a gel-like mixture.

In accordance with a preferred embodiment of the process of the invention, an aliphatic lower alcohol having from 1 to 3 carbon atoms or a mixture of the alcohol and water is used as the solvent, with the alcohol being most preferrd.

Examples of the aliphatic lower alcohol having from 1 to 3 carbon atoms used as a solvent include methanol, ethanol, n-propanol and isopropanol. Of these, methanol is preferred.

In the process of the invention, the lithium compound, preferably lithium hydroxide, is used usually at a Li/Mn atomic ratio of 0.1–1, preferably of 0.2–0.5, in relation to the manganese compound, preferably manganese dioxide. Accordingly, the invention can easily provide a lithium manganese oxide having a formula of $Li_xMnO_2$ in which x is between 0.1 and 1, preferably between 0.2 and 0.5, by appropriately adjusting the amount of the lithium hydroxide relative to manganese dioxide used.

The amount of the solvent used is not particularly limited. It is usually between 20 and 200 milliliters per 100 g of manganese dioxide.

According to a preferred embodiment of the process of the invention, lithium hydroxide and manganese dioxide are mixed together in the alcohol, and the resultant mixture is allowed to react to form a gel-like mixture. Namely, when the lithium hydroxide is mixed with manganese dioxide in the alcohol, a chemical reaction takes place with heat generated. The reaction ceases usually within several tens of minutes to form a gel-like mixture.

More specifically, lithium hydroxide reacts with the solvent to form a corresponding alcoholate while the lithium compound is dissolved in the solvent and is diffused into particles of porous manganese dioxide to form a uniform gel-like mixture. This gel-like mixture is, as required, dried by heating, and then calcined at high temperatures, thereby providing the desired lithium manganese oxide. Herein the specification, a method for preparing a gel-like mixture by mixing lithium hydroxide with manganese dioxide in the solvent and allowing the resultant mixture to react to form the gel-like mixture is sometimes called a liquate impregnation method.

According to the invention, the gel-like mixture is dried as required, and is then calcined in an oxidative atmosphere, e.g., an air atmosphere, at a temperature of from 200 to 350° C., preferably at a temperature of from 200 to 300° C., for from 1 to 5 hours, usually for about 3 hours. The resultant calcined product is crushed and pulverized with a suitable means to provide a lithium manganese oxide suitable for use as a 3 volt cathode material of lithium ion secondary batteries.

The gel-like mixture may be dispersed in water or an aliphatic lower alcohol of 1–3 carbons or a mixture of the alcohol and water, and the resultant dispersion nay be sprayed into an oxidative atmospheres e.g., an air atmosphere, at a temperature of 200–350° C., thereby providing directly a lithium manganese oxide suitable for use as a cathode material of lithium ion secondary batteries without pulverizing the calcined product.

The gel-like mixture may be calcined by means of either an electric oven, a microwave heater or a combination of these. However, it is preferred that the gel-like mixture is first heated to a temperature of 100–350° C. with a microwave heater and then heated with an electric oven to a temperature of 200–350° C. This heating process readily and efficiently provides a lithium manganese oxide having a uniform composition.

The microwave is, as is well-known, one of electromagnetic waves having a wavelength of from 1 mm (frequency 300 GHz) to 1 m (frequency 300 MHz), and it has been hitherto used in communication, high-frequency heating, radar, medical care and the like. In the invention, a microwave having a wavelength of from 3 to 30 cm (frequency from 1,000 to 10,000 MHz) is especially preferred. However, the microwave which can be used in the microwave heating is legally controlled, and a microwave having a frequency of 2,450 MHz can now be actually used in this country.

The principle of the microwave heating is already well known. When a dielectic material (to be heated) is irradiated with a microwave, the dielectric material itself causes heat generation through the dielectric loss. Generally, when a substance to be heated which has a dielectric power factor tan δ and a dielectric constant $\in_r$ is located between a pair of parallel electrodes and a power source having a frequency f (MHz) and a voltage V (V) is connected to a distance D (cm) between the electrodes, a power P per unit volume which is absorbed in the above-mentioned heated material, namely, an amount of heat generated is calculated using the following equation unless there is a space between the heated material and the electrodes.

$$P=(5/9)\, f\in_r \tan\delta(V/D)^2 \times 10^{-12}(W \cdot cm^{-3})$$

As is understandable from the above equation, the amount of heat generated is proportional to the frequency (f) of the microwave heater used and the microwave electric field intensity $(V/D)^2$. Further, in the heated material, the higher the dialectic loss coefficient ($\in_r \tan \delta$), the higher the effect of heat generation by absorption of the microwave.

In the microwave heating, unlike heat conduction, microwave energy is permeated instantaneously into a material to be heated with the velocity of light, and the material to be heated causes heat generation in from several seconds to several minutes. Further, heat generation occurs equally from the surface to the inner portion of the material to be heated at the same time.

On the other hand, metal oxides such as manganese dioxide or lithium manganese oxide have a low thermal conductivity, and hence, as mentioned hereinbefore, it takes a few hours to heat the material to hundreds of degrees Celsius using an electric oven for making uniform the temperatures of the sample from the surface to the inner portion. In addition, it is difficult to optionally control the calcination temperature.

Nevertheless, in accordance with the invention, as stated above, when the gel-like mixture is prepared by use of manganese dioxide and lithium hydroxide, and the gel-like mixture is heated through irradiation with the microwave, the gel-like mixture can be heated to a predetermined high temperature usually in from several minutes to 10 minutes since manganese dioxide and lithium manganese oxide are excellent in the absorbability of the microwave in spite of the low thermal conductivity. During the calcination of the gel-like mixture of Manganese dioxie and the lithium compound through the microwave heating, the mixture may be pulverized during the step and subjected again to the microwave heating if necessary.

Therefore, the process of the invention can readily and efficiently provide the desired lithium manganese oxide having a uniform composition by preparing the gel-like mixture by use of manganese dioxide and lithium hydroxide, as required, drying the gel-like mixture, subjecting the same to the microwave heating usually at a temperature of from 100 to 350° C. preferably from 150 to 300° C., for several minutes, and then calcining the product at a temperature of from 200 to 350° C. with an electric oven. The temperature and the time in the microwave heating are determined depending on the capacity of the microwave heater or the amount of the mixture to be subjected to the microwave heating.

However, it is also possible that the gel-like mixture is heated and calcined with an electric oven at a temperature of from 250 to 350° C. for from 1 to 5 hours, and the resulting product is, as required, pulverized, and then calcined by the microwave heating.

On the other hand, the microwave heating may be used as a means for drying the gel-like mixture. In this case, it is desirable that the heating temperature of the gel-like mixture does not exceed a temperature of 200° C.

As set forth above, the process of the invention makes it possible to produce a lithium manganese oxide suitable for use as a 3 volt cathode material for lithium ion secondary batteries having a high energy density, a large charge-discharge capacity and excellent cycle performance by a simple process by use of less costly starting materials.

The invention is illustrated specifically by referring to the following Examples. However, the invention is not limited thereto. In the following Examples, manganese dioxide used had a purity of approximately 92%, and an amount of manganese dioxide relative to the lithium compound was calculated on condition that the amount of manganese in manganese dioxide was 58% by weight.

EXAMPLE 1

A powder (1.01 kg) of manganese dioxide and a powder (0.157 kg) of lithium hydroxide monohydrate were added to 0.35 liters of methanol with stirring, and the resulting mixture was allowed to react to form a gel-like mixture having a Li/Mn atomic ratio of 0.35.

The gel-like mixture was placed on a microwave heater (1.6 kW) and dried by heating to a temperature less than 200° C. for several minutes. Immediately thereafter, the mixture was placed in an electric oven and calcined for 3 hours at 250° C., 275° C. or 300° C. to prepare a lithium manganese oxide.

Any of the lithium manganese oxide thus obtained was found to have a tap density of more than 2 g/cm$^3$, while the lithium manganese oxide obtained by calcining at 300° C. was found to have a BET specific surface area of 30 m$^2$/g.

The discharge cycle performance of a test cell which had the lithium manganese oxide as a cathode material is shown in Table 1. The initial discharge capacities were found to be approximately in the range of 235–250 mAh/g.

In the test cell, a solution obtained by dissolving 1 M of LiPF$_6$ in a mixture of propylene carbonate (PC) and diethyl carbonate (DEC) at a volume ratio of 1:4 was used as an electrolyte. The charge-discharge current density was 0.4 mA/cm$^2$ and the charge-discharge voltage was from 2.1 to 4.3 V. The same test battery (non-aqueous electrolyte lithium ion secondary battery) as above was used in the following Examples.

TABLE 1

| Calcining Temperature | Discharge Capacity (mAh/g) | | | | |
|---|---|---|---|---|---|
| (°C.) | 1st | 2nd | 5th | 10th | 15th |
| 250 | 233.9 | 224.7 | 199.8 | 184.6 | 171.9 |
| 275 | 237.3 | 227.6 | 204.2 | 190.4 | 179.3 |
| 300 | 247.1 | 237.8 | 215.0 | 194.9 | 179.3 |

EXAMPLE 2

A powder (1.01 kg) of manganese dioxide and a powder (0.157 kg) of lithium hydroxide monohydrate were added to 0.35 liters of methanol with stirring, and the resulting mixture was allowed to react to form a gel-like mixture having a Li/Mn atomic ratio of 0.35.

The gel-like mixture was placed on a microwave heater (1.6 kW) and dried by heating to a temperature less than 200° C. for several minutes. Immediately thereafter, the mixture was placed in an electric oven and heated at 300° C. for 3 hours, 5 hours or 10 hours to prepare a lithium manganese oxide.

The discharge cycle performance of a test cell which had the lithium manganese oxide as a cathode material is shown in Table 2. The initial discharge capacities were found to be approximately in the range of 235–245 mAh/g depending upon the calcining period.

TABLE 2

| Calcining Time | Discharge Capacity (mAh/g) | | | | | |
|---|---|---|---|---|---|---|
| (hr) | 1st | 2nd | 5th | 10th | 15th | 30th |
| 3 | 244.7 | 234.8 | 216.9 | 191.1 | 179.3 | 154.9 |
| 5 | 235.7 | 235.4 | 199.6 | 173.0 | 160.4 | 130.4 |
| 10 | 235.1 | 226.0 | 198.8 | 182.9 | 171.3 | 152.1 |

Figure 2:
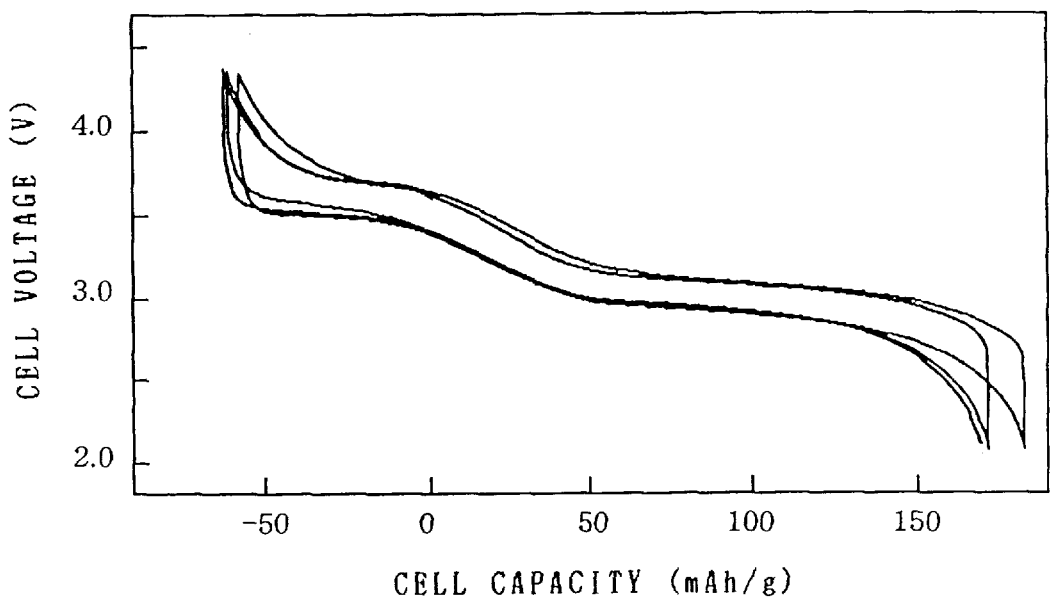
FIG. 2 is a charge-discharge curve of a test cell (non-aqueous electrolyte lithium ion secondary battery) which uses $Li_{0.35}MnO_2$ prepared by the process of the invention as a cathode material.
Figure 3:
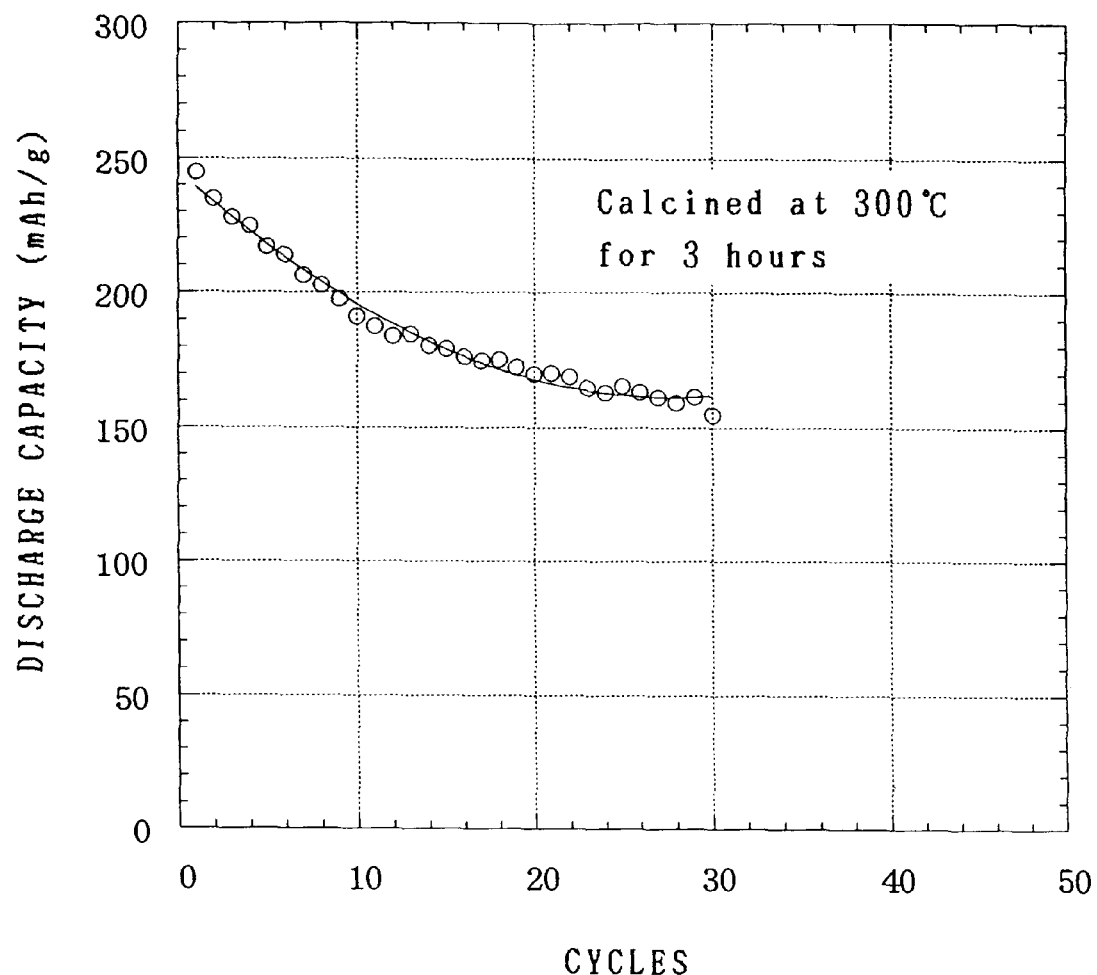
FIG. 3 is a graph showing cycle performance of a test cell which uses $Li_{0.35}MnO_2$ prepared by the process of the invention as a cathode material.

FIG. 1 illustrates an X-ray diffraction pattern (CuKα) of the lithium manganese oxide obtained by calcining the gel-like mixture in an electric oven at a temperature of 300° C. for 3 hours. FIG. 2 illustrates charge-discharge curves of a test cell which had the lithium manganese oxide as a cathode material, while FIG. 3 illustrates cycle performance of the same test cell as above.

EXAMPLE 3

A powder of manganese dioxide and a powder of lithium hydroxide monohydrate were added to 0.35 liters of methanol with stirring at a Li/Mn atomic ratio of 0.25, 0.30. 0.35 or 0.40, and the resulting mixture was allowed to react to form a gel-like mixture having the above Li/Mn atomic ratio, respectively.

The gel-like mixture was placed on a microwave heater (1.6 kW) and dried by heating to a temperature less than 200° C. for several minutes. Immediately thereafter, the mixture was placed in an electric oven and heated at 275° C. for 3 hours to prepare a lithium manganese oxide.

Figure 4:
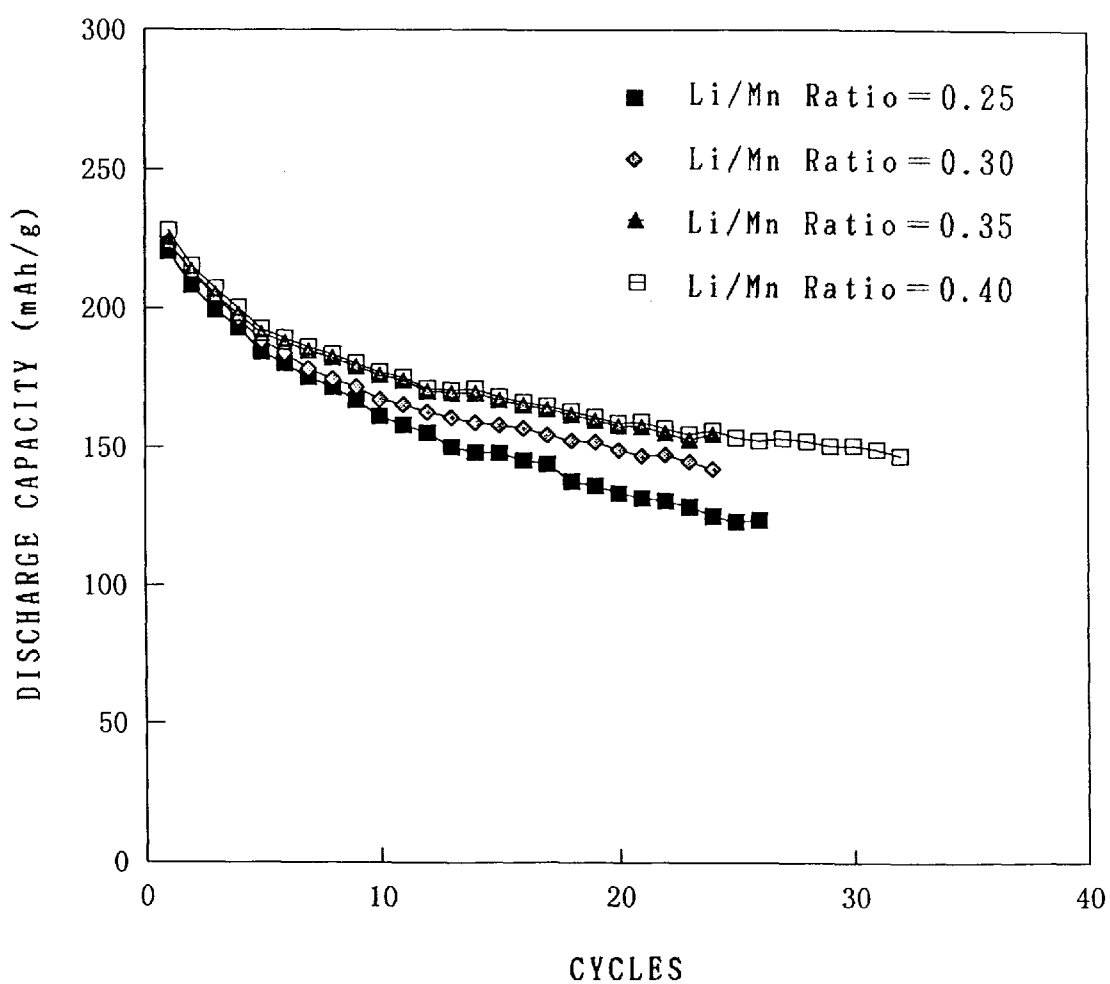
FIG. 4 is a graph showing cycle performance of a test cell which uses $Li_xMnO_2$ wherein x is 0.25, 0.30, 0.35 or 0.40 prepared by the process of the invention as a cathode material.

FIG. 4 illustrates cycle performance of a test cell which had the lithium manganese oxide as a cathode material.

What is claimed is:

1. A process for producing a lithium manganese oxide which has a formula of $Li_xMnO_2$ in which x is between 0.1 and 1 and which is suitable for use as a 3 volt cathode material, which comprises:

mixing lithium hydroxide with porous particles of manganese dioxide at a Li/Mn atomic ratio of 0.1–1 in a solvent consisting essentially of an aliphatic lower alcohol having from 1 to 3 carbon atoms to dissolve the lithium hydroxide in the solvent in the presence of porous particles of manganese dioxide and diffuse the resultant lithium ions into the porous particles of manganese dioxide thereby to form a mixture; and calcining the resulting product in an oxidative atmosphere at a temperature of 200–350° C.

2. The process as claimed in claim 1 wherein the mixture is calcined at a temperature of 200–350° C. either by means of a microwave heater or an electric oven.

3. The process as claimed in claim 1 wherein the mixture is heated to a temperature of 100–350° C. in a microwave heater and is then calcined at a temperature of 200–350° C. in an electric oven.

4. The process as claimed in claim 1 wherein for the purpose of calcining the mixture, the gel-like mixture is dispersed in water or an aliphatic lower alcohol having from 1 to 3 carbon atoms or a mixture of water and the alcohol, and the resulting dispersion is sprayed into an oxidative atmosphere at a temperature of 200–350° C.

5. The process as claimed in claim 1 wherein the lithium compound is mixed with the manganese compound at a Li/Mn atomic ratio of 0.2–0.5.

6. The process as claimed in claim 1 wherein the alcohol is methanol, ethanol or a mixture of these.

7. The process as claimed in claim 1 wherein the lithium hydroxide is added to a suspension of porous particles of manganese dioxide in the solvent.

8. The process as claimed in claim 1 wherein the solvent is used in an amount of 20 to 200 milliliters per 100 g of porous particles of manganese dioxide.

* * * * *